May 30, 1933. W. E. SWERN 1,911,594
TIRE BUILDING DRUM
Original Filed Aug. 23, 1926
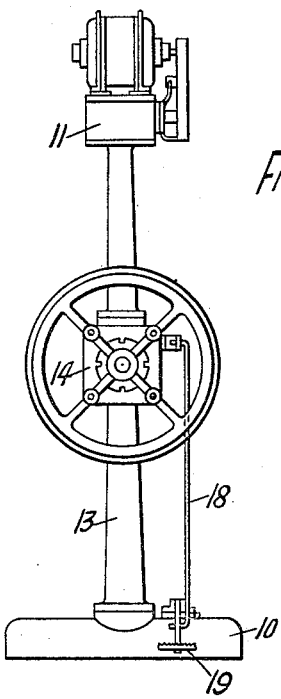
Fig.-1
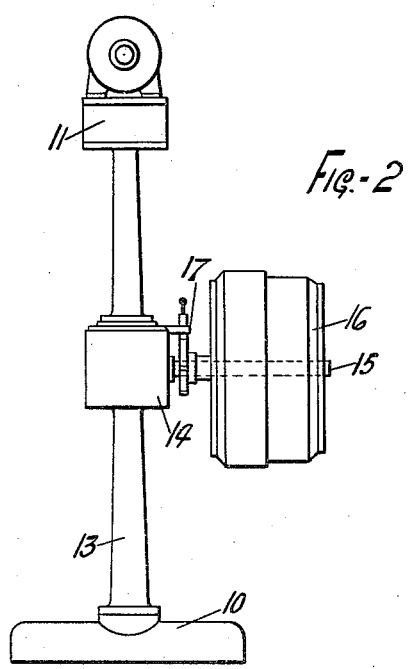
Fig.-2
Fig.-4
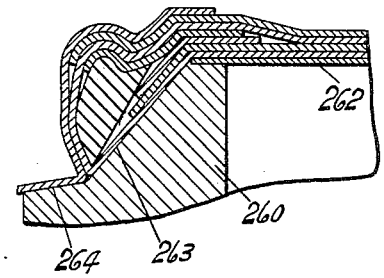
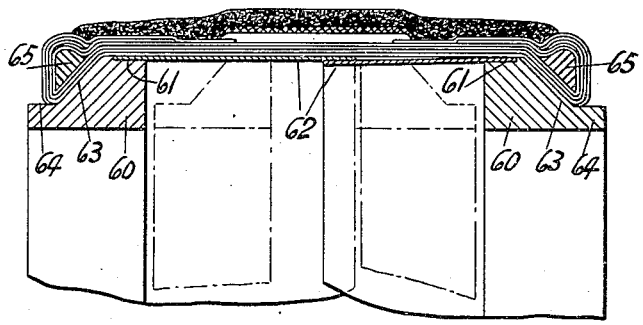
Fig.-3
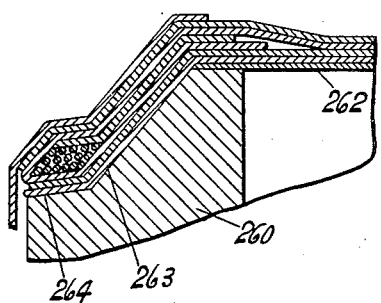
Fig.-5
INVENTOR
WILLIAM E. SWERN
BY Ely &Barrow
ATTORNEYS Patented May 30, 1933

1,911,594

UNITED STATES PATENT OFFICE

WILLIAM E. SWERN, OF KOKOMO, INDIANA, ASSIGNOR, BY MESNE ASSIGNMENTS, TO PAUL A. FRANK, OF AKRON, OHIO

TIRE BUILDING DRUM

Original application filed August 23, 1926, Serial No. 130,883, now Patent No. 1,754,583. Divided and application filed May 20, 1929, Serial No. 364,378, now Patent No. 1,854,813. Divided and this application filed May 5, 1931. Serial No. 535,140.

The present invention relates to the manufacture of pneumatic tire casings or carcasses, and the invention is particularly adapted and useful in the so-called "flat building" or drum methods of manufacture.

In the manufacture of tires by the flat band method as practiced prior to my invention, a transversely flat drum has been used which is capable of being slightly expanded. The inner plies of the carcass are applied to the drum, then the beads are slipped in place thereon and the drum is expanded tightly against the inner peripheries of the beads. The under plies are folded over the beads and then the outer plies are placed over the carcass, over the beads and over the turned-up edges of the under plies and around the beads. When these tires are later expanded in their uncured state to horseshoe shape in section and vulcanized, it is necessary that the bead portions of the tire rotate or twist excessively in reaching their final positions in the finished tire. The excessive twisting of the bead portions of the carcass sets up stresses in the carcass adjacent the bead and causes considerable shifting or displacement of the edges of the plies which cause breaking down of the carcass above the beads when the tires are in service.

In certain types of bead constructions, the bead reinforcement used may twist or rotate upon itself, but other types of reinforcement are not capable of any internal twisting or shifting. In any event the distortion or displacement and twisting of the bead reinforcements and the edges of the fabric plies constituting the carcass is undesirable and may lead to early failures of the tire, but by the use of the present invention these objections are reduced to a minimum and it is possible to build tires by the flat band method in a satisfactory manner, without sacrificing any of the benefits accruing from that method of building.

It has also been suggested to provide a drum with bead seats formed by reduced portions at the edges of the drum, the side faces of which substantially converge toward the center of the drum whereby beads molded and semi-cured to their final shape may be molded in a flat band tire. This form of bead is incapable of any twisting and the process is necessarily limited for this reason. This type of drum, however, requires the additional step of expensive stitching of the inner fabric plies about the converging faces of the bead seats and the important advantage of the flat band method of uniform stretching of the carcass to tire-shape as a whole is not present.

The object of the invention is to provide a form or drum for the building of a tire in which the central or body portion of the drum and the tire built thereon is flat or cylindrical, being provided with drop sides or reduced seats for the location of the beads or bead cores which form the beaded edges of the casings. These seats should not substantially converge and in fact may be inclined outwardly or diverge as shown in the accompanying drawing. This drop side construction permits the positioning of beads in the formation of a flat drum carcass below the cylindrical periphery of the carcass. It also permits using flat wire tape bead constructions and when the tire is later expanded to shape the bead portion of the carcass is not required to twist or rotate excessively, the shifting of the edge of the plies is reduced to a minimum, and this type of bead can accommodate itself to the amount of twisting which is required. By the apparatus shown and described herein, it is possible to build tires by the flat band method and use the wire bead type of reinforcement without the disadvantages of the prior systems and with distinct advantages as is well known to those skilled in this art. Any form of bead reinforcement may be used with the building drum shown herein, and the results are highly beneficial in the commercial manufacture of automobile tires of the straight side variety. For example, the placement of beads against the fabric of the under fabric plies on the sides or reduced shoulders of the drum eliminates loose fabric formations about the beads such as result from attempting to set the beads on the periphery of a flat drum. It will be seen that due to clearance necessary to pass the bead over the inner plies onto the periphery of a flat drum the fabric plies inwardly of the bead are not compressed into snug engagement with the bead when the beads are set. Also with this drum the under plies are more easily turned up about the bead and the over plies are more easily turned down under the bead since the ply-forming tools are easily insertable under the beads on the sides or reduced shoulders of the drum. Further it will be noted that by reason of the crown portion of the drum being greater than the bead diameter the fabric of the flipper and breaker strips is not stretched or expanded so much as with the tire built entirely flat. These strips are not shaped so much as they are expanded when a tire is shaped and are likely to be excessively strained by expansion of a tire built entirely flat. A further advantage of the use of this drum is that by making the crown diameter of the drum in certain proportions with respect to the rim diameter of the finished tire for the various sizes of tires, fabric cut on the bias using the same cutting angle may be employed for various sizes of tires and will produce tires when expanded and vulcanized in which the angles of the cords are approximately the same. This dispenses with frequent adjustment of fabric bias cutters to produce runs of stocks cut upon the bias at different angles. Thus in providing drums in accordance with this invention of different sizes for the different sizes of tires to be made the crown diameters of the drums may be increased with respect to the rim diameters whereby the same initial bias cutting angle may be maintained for all fabric plies.

This invention is a division from my co-pending application Serial No. 364,378, filed May 20, 1929, which is in turn a division of my application Serial No. 130,883, filed August 23, 1926, now Patent No. 1,754,583, dated April 15, 1930, which latter as stated therein is a continuation in part of my application Serial No. 723,353, filed June 30, 1924, now Patent No. 1,741,208, dated December 31, 1929.

The full nature of the invention will be understood from the accompanying drawing and the following description and claims:—

Of the accompanying drawing,

Figure 1 is a front elevational view of a single unit drum;

Figure 2 is a side elevational view thereof;

Figure 3 is an enlarged central sectional view of a portion of tire carcass and the supporting drum showing the parts in expanded position, the dotted lines showing the parts in the telescoped or collapsed position for carcass removal, the tire illustrated being of the clincher type; and Figures 4 and 5 are enlarged central sectional views of a portion of a modified drum with the carcass positioned thereon, the former figure illustrating a drum adapted for clincher type tires and the latter a drum for straight side type tires with wire tape type of bead reinforcement.

In the drawing, 10 indicates a base and extending upwardly therefrom is a supporting standard 13. Projecting laterally from said standard is a support 14 for a drum spindle 15 mounting the drum 16. A suitable clutch is associated with the spindle and the drum is rotated through power means controlled by a link 18 and terminating in the foot lever 19. Lock 17 holds the shaft stationary for telescoping the drum through parts not shown so that the parts of the drum may be telescoped when the drum is rotated either by hand or by momentum previously acquired through shaft rotation.

The drum may consist of a pair of annular members 60 provided with a peripheral face 61 recessed to receive a cylindrical member 62, the said cylindrical members being telescopically associated. In this way any width of drum surface can be obtained for any given diameter of bead. Of course different diameter drums may be substituted so that the same machine, by interchanging drums, is capable of forming carcasses for a complete line of tire sizes.

Each of the circular members 60 includes face 63, and in the drawings these faces are shown oppositely inclined to each other and being relieved or tapered as at 64. The drum is suitably supported upon the spindle 15 and is rotated thereby. The inclined face 63 and relieved portions 64 permit the bead 65 of the tire to lie substantially below the main body portion thereof when formed on the drum. This constitutes the drop side formation of the tire carcass.

The resultant adjustable drum construction permits any width of tire to be obtained for any given bead diameter and, as shown in the drawing, said tire may be of either the straight side or clincher type, Figures 3 and 4 illustrating the clincher type and Figure 5 the straight side type.

Figures 4 and 5 show substantially the same drum, the first being adapted for forming clincher type tires and the second for straight side tires. These drums differ from those shown in Figure 3 by having a relieved face 264. The same parts are indicated by numerals of the 200 series, 262 indicating the tubular portions telescopically associated together, 260 indicating the frame members and 263 the inclined face.

In the manufacture of these tires the inner carcass plies may be folded or formed down onto the bead seats and the bead portion thereof is built in such position that rotation or twisting of the bead portion of the carcass occurs in passing from the flat built condition to the shape of a tire casing.

By the construction of the drum shown herein the beads are seated in axially offset relation to the cylindrical portion of the drum and the carcass plies are easily formed over these seats.

To remove the carcass of the tire from the drum the two sections of the drum are brought together, decreasing the overall width of the drum to such an extent that the tire may be removed by swinging one side of the tire over the collapsed drum, while the other side of the drum is forced into the central portion of the casing.

After the tire is removed from the drum, it is brought to tire form by bringing the edges together and expanding the central portion of the tire. The beads which are employed will twist sufficiently without injuriously affecting the plies of building fabric adjacent thereto. The tire is then vulcanized in the usual manner.

Modifications of the invention may be resorted to without departing from the spirit thereof or the scope of the appended claims.

What is claimed is:—

1. A machine for building drum type tires of the character described, comprising a drum including a cylindrical tire body supporting surface, and an annular face extending inwardly from each of the edges thereof and inclined outwardly from each other for supporting the beads substantially flush with the tire body, said inclined bead supporting surfaces being unobstructed laterally to permit the placement of circular beads against said surfaces.

2. A machine for building drum type tires of the character described, comprising a drum including a cylindrical tire body supporting surface, and an annular face extending inwardly from each of the edges thereof and inclined outwardly from each other for supporting the beads substantially flush with the tire body, each of the inclined annular faces being provided with an annular oppositely directed extension and unobstructed to permit sidewise placement of a circular bead.

3. A machine for building drum type tires of the character described, comprising a drum including a cylindrical tire body supporting surface, and an annular face extending inwardly from each of the edges thereof and inclined outwardly from each other for supporting the beads substantially flush with the tire body, each of the inclined annular faces being provided with an annular oppositely directed extension, said extensions being inclined toward the axis.

4. A tire building drum having a substantially cylindrical periphery with substantially non-converging faces at the sides thereof onto which the margins of inner tire carcass plies may be formed, said faces providing seats against which the preformed, circular beads of the tire may be set on said inner carcass plies.

5. A tire building drum having a substantially cylindrical periphery with diverging faces at the sides thereof onto which the margins of inner tire carcass plies may be formed, said faces providing seats against which the preformed, circular beads of the tire may be set on said inner carcass plies.

6. A drum for building tires by the flat band method, said drum having a substantially cylindrical building surface, and laterally unobstructed and reduced bead seats on opposite sides thereof, the bead seats being so located that the beads are set in an angular position different from that occupied in the finished tire whereby the beads are required to twist in the subsequent formation of the tire preparatory to vulcanization.

7. A drum for building tires by the flat band method, said drum having a substantially cylindrical peripheral portion with faces at the sides thereof on which circular beads may be seated within the outer periphery of the cylinder, said faces being unobstructed and so located as to position the beads in laterally offset relation to said cylindrical portion.

8. A drum for building tires by the flat band method, said drum having a substantially cylindrical portion with reduced, unobstructed bead seats at the sides thereof, said seats being adapted to position preformed, circular beads in laterally offset relation to said cylindrical portion, said drum having surfaces connecting said bead seats with the peripheral cylindrical portion.

WILLIAM E. SWERN.